May 30, 1967 P. F. LITTLE 3,321,929
HEATING AND COOLING SYSTEM
Filed July 8, 1965
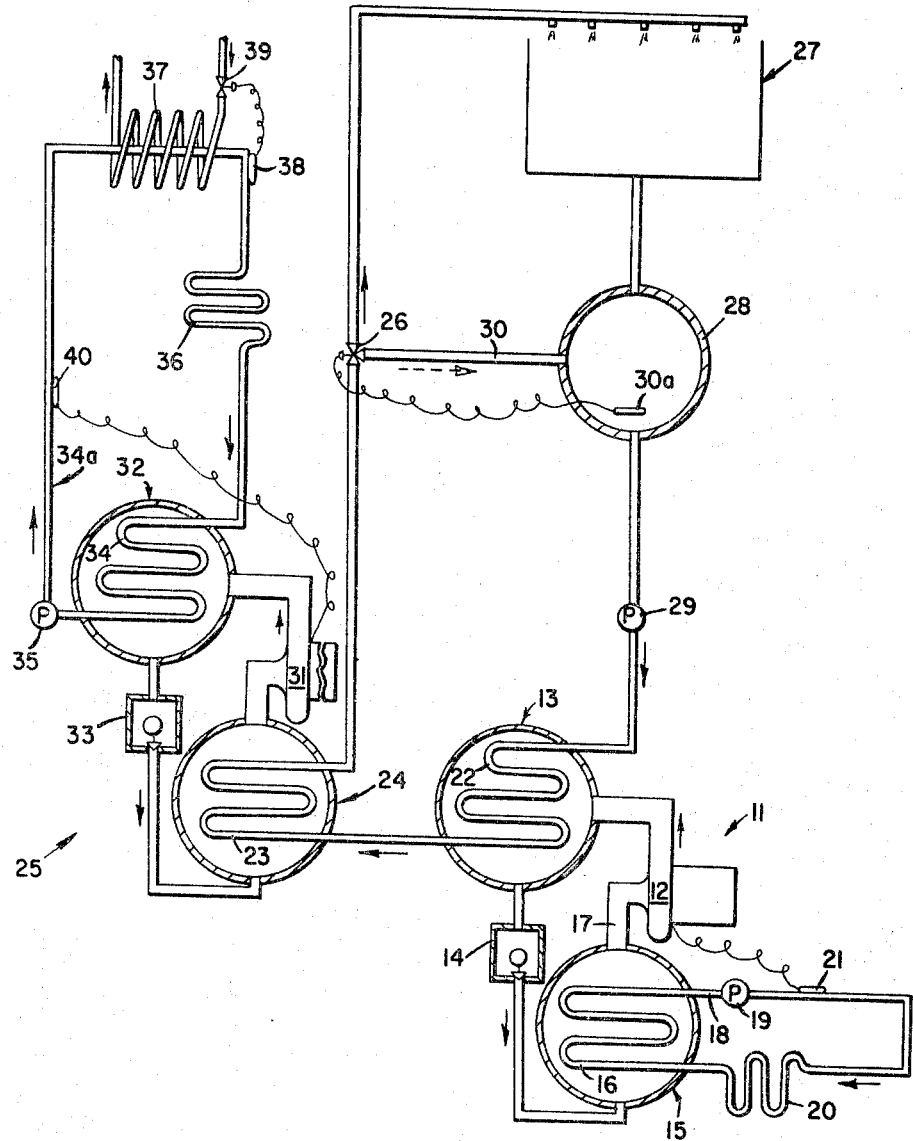
INVENTOR.
PHILIP F. LITTLE.
BY Robert F. Ruemeli
ATTORNEY.

3,321,929
HEATING AND COOLING SYSTEM
Philip F. Little, De Witt, N.Y., assignor to Carrier Corporation, Syracuse, N.Y., a corporation of Delaware
Filed July 8, 1965, Ser. No. 470,403
3 Claims. (Cl. 62—181)

This invention relates to a heating and cooling system and, more particularly, to a heating and cooling system having a centrifugal refrigeration machine for providing cooling and rejecting the heat involved therein, and another centrifugal refrigeration machine for reclaiming the rejected heat and passing the heat to a load having a heating requirement.

A problem with many heating and cooling systems is the utilization of excessive power for operating the system. For example, during normal operation of such a system, both heating and cooling are required for adequately air conditioning a building. Considering the heat imparted to a building by people and machines in the building, at 25° F. outside or ambient temperature the heating and cooling requirements may be equal so that it is merely necessary to pass heat from warmer areas to cooler areas, but at 95° F. outside temperature possibly no heating is required and only cooling is necessary. Between these extremes, the proportion of heating and cooling required to satisfy a typical building load will vary and, for economic reasons, it is highly desirable that the air conditioning requirements be satisfied at a minimum power output.

It is a primary object of this invention to provide a new and improved heating and cooling system and, more particularly, to provide such a system which is economical in operation.

Another object is to provide a new and improved heating and cooling system having a first refrigerating machine for cooling a load and rejecting the heat evolved therein, and a second refrigerating machine for reclaiming the heat rejected by the first refrigerating machine only to the extent required to heat a load having a heat requirement at a higher temperature level than is available in the condenser of the first machine. A related object is provision for operating the second refrigerating machine only when the heating load requires heat.

These and other objects of the invention will be apparent from the following description and drawing which is a schematic diagram of a preferred embodiment of a heating and cooling system incorporating features of the invention.

Referring to the drawing, a heating and cooling system is illustrated and incorporates a pair of centrifugal refrigerating machines each having a centrifugal compressor. A first of the machines 11 includes a compressor 12 for passing refrigerant vapor to a condenser 13 from which refrigerant condensate passes through a suitable flow metering device such as a float valve unit 14 and to an evaporator 15 where it vaporizes as heat is extracted from water in a chilled water bundle 16. The vapor is withdrawn through a suction line 17 to the compressor 12. The chilled water bundle 16 is part of a chilled water line 18 and is in circuit with a pump 19 for passing the chilled water to a load having a cooling requirement and illustrated as a coil 20. Cooling operation is regulated in any suitable manner as by a temperature sensor 21 on the leaving branch of the chilled water line 18 for controlling the compressor 12.

A condensing water bundle 22 in the condenser 13 of the first machine is connected in circuit with a second chilled water bundle 23 in an evaporator 24 of a second refrigerating machine 25 from which the condensing water passes through a modulating three-way valve 26 to a cooling tower 27 and then to a sump or accumulator tank 28 and through a condensing water pump 29 back to the condensing bundle 22 of the first machine 11. In order to maintain a desired minimum condensing water temperature in the accumulator 28, for example 65° F., a bypass line 30 is provided from the modulating three-way valve 26 into the accumulator tank 28 so that when the tank temperature deviates sufficiently from normal, as sensed by a sensor 30a in the tank, the valve 26 may be positioned to pass either all or a part of the flow through bypass 30 directly into the accumulator tank.

The second refrigeration machine 25 includes the second evaporator 24 connected in circuit with a second compressor 31 for withdrawing refrigerant vapor from the evaporator and passing compressed vapor to a second condenser 32 from which the refrigerant condensate returns through a float valve unit 33 to the evaporator 24. A condensing coil 34 in the second condenser 32 is part of a heating line 34a and is connected in circuit through a condensing water pump 35 with a load having a heating requirement, illustrated in the form of a coil 36, from which cooled condensing water returns to the condensing bundle 34 in the second condenser 32.

The operation of the heating and cooling system is as follows. During cooling operation, the heat is rejected by the first refrigerating machine 11 to its condensing water which passes through the chilled water bundle 23 in the evaporator 24 of the second refrigerating machine 25. Any heat in this condensing water not required for satisfying the load represented by coil 36 is rejected through the cooling tower 27 from which the condensing water returns to the first condensing bundle 22 through the accumulator tank 28 and pump 29. If heating is required by heating load 36, machine 25 is in operation and the compressor 31 of the second refrigerating machine 25 withdraws refrigerant vapor resulting from cooling the chilled water bundle 23 in the second evaporator 24, and the temperature of the vapor is increased substantially to heat the condensing water passing through the second condenser bundle 34, and this water, in turn, heats the load 36 and is cooled thereby. Thus, the heat rejected by the cooling system including the first refrigerating machine 11, is reclaimed and passed to the heating load 36 by the second refrigerating machine 25.

Should inadequate heat be provided by the second refrigerating machine 25 for heating the load 36, a suitable auxiliary heater 37 is provided for heating the condensing or heating water to the heating load 36 and is controlled as by a suitable sensor 38 on the heating line 34a, for operating a modulating control valve 39 in the event the auxiliary heater 37 utilizes steam or hot water. This supplementary heating could also be done by electricity. The second compressor 31 is preferably controlled by a similar sensor 40 on the heating line 34a downstream of the auxiliary heater 37.

A substantial advantage of the invention is that the second refrigerating machine 25 which provides heating for the heating load 36, need be operated only if heat is required by the load, and then the power input need be only that required to provide sufficient heat. In the event that no heat is required, all of the condensing water from the first refrigerating machine 11 which provides cooling for the cooling load 20, is rejected through the cooling tower 27. Additionally, the second refrigerating machine 25 may be provided with a relatively low pressure refrigerant so that sufficiently high heating water temperature, that is the temperature of the condensing water from the second condenser 32, may be obtained at relatively low pressures throughout the second machine 25, thus reducing the structural strength required in the second refrigerating machine.

In known refrigeration machinery for satisfying simultaneous heating and cooling requirements as well as a heating requirement solely or a cooling requirement solely, the condensing of refrigerant is accomplished by a first cooling circuit including the heating requirement and a second circuit including a cooling tower or similar heat sink. A variation in the heating requirement involves variation in the amount of heat rejected in the cooling tower. In any event, to satisfy any heating requirement imposed on the machine, the temperature level must be maintained at a relatively high value. This of course requires a correspondingly high pressure level in the refrigerant condenser so that even if there is a low heating demand on the machine, the pressure level must be maintained at a high value, necessitating pumping the entire refrigerant flow from the low pressure side of the machine to the condenser.

The arrangement forming this invention rejects the excess heat at a relatively low pressure level so that only the heat, as represented by the high pressure gaseous refrigerant, necessary to satisfy the heating requirement is pumped to the relatively high pressure level necessary to satisfy the heating requirement. A considerable saving in operating cost will ensue.

It should also be noted that when the system must satisfy a relatively large heating demand and a relatively small cooling demand, the refrigerant condensing temperature of the centrifugal machine 11 may be substantially lower than if the centrifugal machine were required to operate at a condensing temperature sufficient to satisfy the heating demand. By providing such lower refrigerant condensing temperature of the centrifugal machine at relatively small cooling capacity, centrifugal compressor surge problems are substantially reduced.

While a preferred embodiment of the invention has been described and illustrated, it should be understood that the invention is not limited thereto but may be otherwise embodied within the scope of the following claims.

I claim:

1. A heating and cooling system comprising first refrigerating means having a first centrifugal compressor for circulating a refrigerant to cool a load and having first refrigerant condenser means in circuit with said compressor for rejecting the heat evolved therein to condensing water circulated through said condenser means, second refrigerating means for heating a load and including, evaporator means for receiving said condensing water and transferring heat therefrom to refrigerant circulated through said evaporator means, a second centrifugal compressor in circuit with said evaporator for circulating refrigerant through said evaporator to receive heat from said condensing water circulated through said evaporator and for increasing the temperature of said refrigerant above the temperature of said condensing water, and condensing means in circuit with said second centrifugal compressor for receiving said refrigerant from said second compressor and transferring heat from the last said refrigerant to fluid circulated through said condensing means, means for passing said fluid to the load to be heated and heating the load with the reclaimed heat from said first refrigerating means, and means for regulating the first refrigerant condenser whereby said condensing means operates at relatively low temperature at low heating capacity so that said second centrifugal compressor operates at relatively low lift at low heating capacity thereby relieving surge problems.

2. The system of claim 1 wherein said condenser means and said evaporator have condensing water circuits connected in series with each other.

3. The system of claim 1 and other means for rejecting any said heat in said condensing water from said evaporator circuit in excess of the heat required for satisfying the heating capacity.

References Cited
UNITED STATES PATENTS

| | | | |
|---|---|---|---|
| 3,067,587 | 12/1962 | McFarlan | 62—159 |
| 3,081,604 | 3/1963 | Namisniak | 62—84 |
| 3,267,689 | 8/1966 | Liebert | 62—277 |

ROBERT A. O'LEARY, *Primary Examiner.*

MEYER PERLIN, *Examiner.*

W. E. WAYNER, *Assistant Examiner.*